United States Patent [19]

Lindenthal et al.

[11] Patent Number: 4,946,422
[45] Date of Patent: Aug. 7, 1990

[54] UNIVERSAL JOINT FOR A DRIVE SHAFT

[75] Inventors: Hans Lindenthal, Heidenheim; Reinhard Bretzger, Gerstetten, both of Fed. Rep. of Germany

[73] Assignee: J. M. Voith GmbH, Fed. Rep. of Germany

[21] Appl. No.: 600,471

[22] Filed: Apr. 16, 1984

[30] Foreign Application Priority Data

Apr. 20, 1983 [DE] Fed. Rep. of Germany ....... 3314322

[51] Int. Cl.$^5$ .............................................. F16D 3/40
[52] U.S. Cl. .................................. 464/135; 403/57; 464/136
[58] Field of Search .................. 403/57, 58, 338; 464/128, 134, 135, 136

[56] References Cited

U.S. PATENT DOCUMENTS

| | | | |
|---|---|---|---|
| 1,143,596 | 6/1915 | Bockhoff | 464/134 |
| 1,153,789 | 9/1915 | Hopkins | 464/135 X |
| 1,571,595 | 2/1926 | Lovejoy | 464/132 X |
| 2,113,998 | 4/1938 | Swenson | 464/128 |
| 3,703,089 | 11/1972 | Geisthoff et al. | 464/135 |
| 4,077,235 | 3/1978 | Kleinschmidt et al. | 464/128 X |
| 4,130,325 | 12/1978 | Schultenkämper | 464/131 X |
| 4,144,724 | 3/1979 | Armasow | 464/128 |
| 4,167,859 | 9/1979 | Okuda | 464/128 |
| 4,180,989 | 1/1980 | Lange | 464/135 |
| 4,191,487 | 3/1980 | Schultenkamper . | |
| 4,253,776 | 3/1981 | orain | 464/182 X |
| 4,300,361 | 11/1981 | Lindenthal et al. | 403/57 X |

FOREIGN PATENT DOCUMENTS

| | | | |
|---|---|---|---|
| 2158436 | 5/1973 | Fed. Rep. of Germany | 403/57 |
| 3149156 | 6/1983 | Fed. Rep. of Germany . | |
| 2487933 | 2/1982 | France . | |
| 575698 | 2/1946 | United Kingdom | 464/135 |
| 709298 | 5/1954 | United Kingdom | 464/135 |
| 2006923 | 5/1979 | United Kingdom . | |
| 2014696 | 8/1979 | United Kingdom . | |
| 2068506 | 8/1981 | United Kingdom . | |
| 1602319 | 11/1981 | United Kingdom . | |
| 2125935 | 3/1984 | United Kingdom . | |

Primary Examiner—Daniel P. Stodola
Attorney, Agent, or Firm—Ostrolenk, Faber, Gerb & Soffen

[57] ABSTRACT

In a universal joint for a drive shaft or Cardan shaft each yoke or fork has two arms or bosses which are connected to the pins of the central spider or cross. At least one or both of the yoke arms or fork arms is removable from the remainder of the yoke or fork at parting lines spaced around tie fork away from the fork arm or boss which receives the pin therein. Each yoke or fork includes a hub extending away from the spider or cross to receive the drive shaft. In some embodiments, the removable are of the fork terminates in a flange which is separably clamped to the end of the hub for torque transmission between them. In another embodiment, the hub is an integral rearward extension fromt he respective fork arm and the hub is comprised of a tube half. With two such tube halves, each half is attached to one of the two arms of the york or fork, and clamping rings hold the tube parts and thus the yoke arms together.

8 Claims, 2 Drawing Sheets

FIG. IA

UNIVERSAL JOINT FOR A DRIVE SHAFT

BACKGROUND OF THE INVENTION

The present invention relates to a universal joint for a drive shaft or a Cardan shaft and in particular to a joint yoke or fork wherein the individual yoke arms or fork arms can be separated from each other and are secured to each other.

A universal joint usually joins a drive and a driven shaft and includes as its major components a first yoke or fork attached to the end of of the shafts, a second yoke or fork attached to the end of the other of the shafts and a spider or cross having pairs of opposite, outwardly directed pins disposed between the forks and between the arms of the forks, which are otherwise known as the bosses of the yoke. Each fork arm or boss receives one of the pairs of pins, so that the yoke will pivot around an axis defined by the respective pairs of pins for that yoke.

Such a universal joint is known from Federal Republic of Germany Allowed Application No. DE-AS 25 55 667, The torque which can be transmitted by the shaft connected to one half of the joint is determined by the strength of the universal joint, and particularly of the spider or cross and of the spider bearing. The internal construction of the bearing determines its life, while the shape of the spider and of the yokes or forks participates in determining the stiffness of the shaft. Measures for increasing the transmittable torque relate to the spider, the bearing and the yokes. With a predetermined structural space or predetermined size of joint, narrow limits, however, are placed on an increase in the size of all of the said components, particularly with due consideration of the angles of deflection which are required in operation. Greater operating strength and longer life are being increasingly demanded on the part of universal-joint shafts with the use of the same or smaller outside dimensions.

It is known that an antifriction bearing of the roller-bearing type has a higer dynamic, but lower static, carrying capacity than a needle-type antifriction bearing of the same size. It is therefore proposed in Federal Republic of Germany Published Application No. DE-OS 26 36 752 (corresponding to U.S. Pat. No. 4,167,859) that the bearing for the spider be equipped with needle bearings in order to be able to install a larger and stronger spider. In the prior art, the purpose was to dimension the spider bearing with the same static load-carrying capacity as the other statically stressed parts of the universal shaft, i.e. spider, yokes, slide piece, etc. This produces relatively small universal joints. However, they do not satisfy the expectations as to life in the case of dynamically high stresses, for instance when they are used as heavy drive shafts in the extreme and intermittent operation of a rolling mill. It has already been recognized that the increase in the size of a roller bearing which is capable of high dynamic loads leads to difficulties in mounting in the case of single-piece yokes and bearing bosses.

In Federal Republic of Germany Allowed Application No. DE-AS 26 25 960, therefore, specially stepped-down rows of rollers have been proposed. The embodiment disclosed in Federal Republic of Germany Allowed Application No. DE-AS 26 53 908 is provided with split bearing bosses or fork arms which make it possible to provide an amply dimensioned roller bearing and a strong spider. However, there is the disadvantage here of the loss of design strength of the yoke or bearing boss or fork arm due to the transverse division of the bearing bosses. A bearing boss of rigid form is, however, necessary with respect to the life of the bearing in order to protect the roller bearing from elastic deformation under load.

U.S. Pat. No. 4,334,415 describes a universal joint design in which the bearing for the spider is developed in one part but is bolted at the end in the manner of a bearing pedestal to the hub, which is developed in the form of a flange. The bolting forms the detrimental weak point of the universal joint. The yoke does not have the required stiffness.

SUMMARY OF THE INVENTION

The object of the present invention is to provide a universal joint for a drive shaft of the above-mentioned type, and particularly for industrial universal drive shafts subjected to high loads.

A further object is to enable a spider or cross having the largest possible pin diameter and a spider mount with roller bearings having the greatest possible load-carrying capacity to be arranged within a given space. Yet another object of the invention is for the spider to still be easy to mount and the yoke piece and bearing boss to exhibit optimum stiffness under dynamic stressing.

Another object of the invention is to enable the bearing boss of the yoke, that is the fork arm, to be as stable in form as possible, and particularly to be undivided, even though the yoke or fork may be made with one or both of its arms separable to enable assembly of the yoke or fork to the pins of the spider or cross.

According to the invention, the universal joint includes a spider or cross, having oppositely, outwardly directed pairs of pins. Each pair of pins is for a respective pair of the bosses or arms of the yokes or forks. At least one of the yokes and possibly both of the yokes has at least one and possibly both of the yoke arms or fork arms separable from the remainder of the yoke or fork. Means are provided for clamping the two yoke arms or bosses together and for thereby clamping them securely over the respective oppositely directed pins of the cross.

Each yoke is connected with a hub which extends in the direction away from the cross, and the hub is mounted to the respective shaft or other drive or driven means to which the yoke is to be connected.

The yoke or fork should be split in its entirety, i.e. at least one of the two yoke arms is made removable. This has a number of advantages. The bearing yoke arm or boss remains as a dimensionally stable single piece and, as in the case of an undivided yoke, remains a part of the adjoining yoke arm through which the force is transmitted to the bearing boss. In this way, there is no interruption in the flow of force at those places of the yoke or fork which are subjected to the highest specific stress. Between the at least one removable yoke arm and the other yoke arm, there are a pair of parting lines which are disposed on the yoke away from the bosses or yoke arms.

The parting lines are shifted to a place where large cross-sections are available for the transmission of force. These are the regions at which the yoke adjoins the adjacent hub part and, there again, has essentially the rounded shape which is generally customary. A relatively neutral zone is present in the plane of symmetry of the yoke between the bearing bosses at the hub if one proceeds from the basis that the flow of force takes place through the outer edge regions of the hub into the yoke arms. This circumstance has been utilized in order to effect a splitting of the yoke arms in a region which is subject only to slight stresses, without the homogeneous flow of force from the hub into the yoke arms being interfered with.

In a further embodiment, both fork arms or yoke bosses of the yoke or fork are in identical removable form, with each of the yoke arms covering about half the circumference on the surface facing the hub. The resulting wide base for taking over the load between hub and the yoke arms is advantageous.

In another embodiment, the removable yoke arm or arms each have sides that face away from the spider. A respective flange at that end side of each removable arm is connected by torque transmitting means to the pposed end of the hub for that yoke, whereby there is torque transmission between the respective yoke and the hub therefor. That torque transmission connection may be respective interengaging toothing or may be a form locked driving element which projects into both the flange and the hub, for example.

The yoke flanges and the hubs are preferably clamped together, and especially are axially clamped together for effecting the torque transmission. The clamping connection between the removable yoke arms can advantageously be effected by axial clamping bushings, known from German Patent Application No. P 31 49 156.1-12, for example. In view of the length of the axial clamping bushings, they assume the function of expansion bolts. With an end toothing for torque transmission and for centering between the hub and the removable yoke arms, such bolts would lead to a disadvantageous disturbance in the flow of force. Instead of an end toothing, one or more form-locked elements could also be used between the hub and the removable yoke arms, where the centering is effected in some other customary fashion. The axial clamping bushings are, in this connection, advantageously placed on the hub and on the yoke arms in such a manner that the parting lines between the yoke-arm halves are covered by the bushings. The parting-lines of the yoke arms and of the axial clamping bushings are staggered with respect to each other.

Alternately, instead of the yokes being separate from the hubs and being joined thereto by torque transmitting means, the removable yoke arms are extended on their sides facing away from the center of the universal joint so as to form their own hub, with each yoke arm extending into and defining a pipe half. The two pipe halves of the yoke arms, calmped together, form the actual annular hub. The two halves are preferably connected by ring-shaped clamping elements, for instance by shrinking them on. The transmission of torque from the shaft to the hub is effected in a customary manner via keys, spline-profiled parts, or the like. The use of assembly-friendly joining techniques with structural parts of high static and dynamic strength is useful for practicing the invention.

Other objects and features of preferred embodiments of the invention will be described below with reference to the accompanying drawings.

BRIEF DESCRIPTION OF THE DRAWINGS

FIGS. 1A and 1B each show an embodiment of a universal joint, partially in elevation and partially in section;

DESCRIPTION OF THE PREFERRED EMBODIMENTS

Figure 1B:
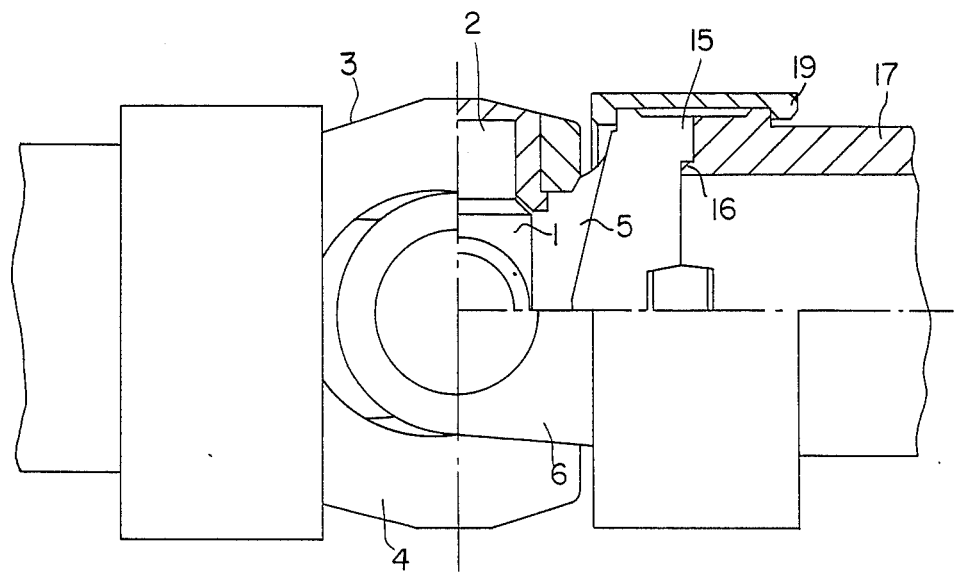

The two universal joint embodiments shown in FIGS. 1A and 1B are shown in cross-section in part of the upper half of the respective Figure and in external elevational view in the lower half. The joint at the left in FIG. 1A includes a spider or cross 1 having four pins 2 which are mounted in pairs in yokes or forks 3, 4 and 5, 6 respectively. There is a respective, annular bearing mount 7 between each of the pins 2 of the spider and the yokes 3 to 6. Each mount 7 contains a bushing with antifriction bearings, namely roller or needle bearings and possibly, thrust bearings, and also includes corresponding packings between the respective pin 2 and the antifriction bearing. The yokes 3, 4 and 5, 6 are developed along the axes of the respective pins 2 of each yoke with each yoke arm being a boss which annularly surrounds the annular spider mount 7. On its side facing the drive shaft, the yoke 3, 4 is developed as a flange 8, which has annular toothing 9 arranged at its end. In the axial direction, a hub 10 adjoins the yoke 3, 4. The hub 10 is developed as an annular flange. The hub 10 is provided, in the same manner as the yoke, with end toothing 9 into which the teeth of the yokes 3, 4 extend. The hub 10 transmits the torque, for instance, as a tubular shaft. The hub 10 may also be developed as a socket for a slide piece in order to equalize the length of the drive shaft.

The distinguishing feature of the invention is that the yoke 3, 4 is not a single part but is developed as two parts, each including a respective yoke arm or boss. The two halves 3 and 4 together form the yoke, and there is an axially extending parting line 11 between them through the midpoint of the distance between the yoke arms. The two halves of the yoke 3, 4 are connected in force-locked and form-locked manner to the hub 10 via the end toothing 9. Tfhe axial force for clamping together the hub 10 and the two yoke halves 3 and 4 is applied for instance, by means of axial clamping bushing parts 12, 13, which are shrunk on over radially projecting, annular flanges on the hub and the yoke halves 3, 4. The advantage of this type of fastening is that the outside diameter of the coupling is at no place greater than the diameter of rotation of the universal joint.

There is a primary advantage of splitting the yoke. The mounting of the spider takes place in the following sequence. First, the spider bearings 7 are pressed, completely assembled, into the bearing bosses of the yoke halves 3 and 4. The yoke halves are next pushed onto two opposite pins 2 of the spider 1. Only then are the still separate yoke halves connected at their ends to the hub 10 via the annular toothing 9 on the flange 8. The axial clamping bushing parts 12 and 13 are applied and the pressing force of these bushing parts is distributed uniformly over the entire circumference covered by the bushing parts: For reasons of manufacture, it is advisable to make the two yoke halves 3, 4 practically identical and to slit them in the central plane that is perpendicular to the axis of the pins 2 so that the flange 8 and the toothing 9 extend in each case over approximately half the circumference. In the embodiment shown, in which the two separate axial clamping bushings 12, 13 are also provided in two separate parts, they are placed on the flanges of the hub and yoke halves on both sides of the end toothing 9 so that the parting lines of the bushing parts are offset by 90° from the parting lines of the yoke halves 3, 4.

It is essential for this embodiment that the axial clamping bushings have a large axial length, whereby a considerably greater initial stressing can be applied to the toothing than, for instance, could be applied by the use of bolts.

The introduction of force into the yoke halves 3, 4 takes place uniformly approximately over half the circumference, i.e. over the entire region connected with the hub. As in the case of an undivided yoke, the introduction of force into the bearing 7 and on the pins 2 takes place over the solid flange 8 and into the respective boss of the yoke halves which surrounds a bearing 7. In this highly stressed region, there is no additional parting line and no screw attachment. Thus, a very stable and dimensionally rigid structural part is created which permits better seating of the bearing 7 using antifriction bearings capable of carrying high loads, with at the same time optimum simplicity in assembly.

In the embodiment shown at the right-hand part of FIG. 1B, a different type of attachment of the yoke 5, 6 to the hub 17 is shown. 5, 6 are again two yoke halves which together form a yoke. The parting line between the halves 5, 6 in this case extends in the plane of the drawing. The yoke halves 5, 6 are provided with a flange 15 and have a centering cutout 16, via which attachment is effected to the hub 17. The hub 17 has a flange shaped to fit into the cutout 16. The transmission of torque between the yoke halves 5, 6 and the hub 17 takes place through a transverse key 18 which may be of slightly conical development. The key projects into the flange of the yoke and into the hub. The yoke and hub are clamped in the manner already described, by means of axial clamping bushing parts 19, 20. The hub 17 can be developed as a flange, a tubular shaft, or the like, or for instance, as a wobbler for a roll in a rolling mill.

Figure 2:
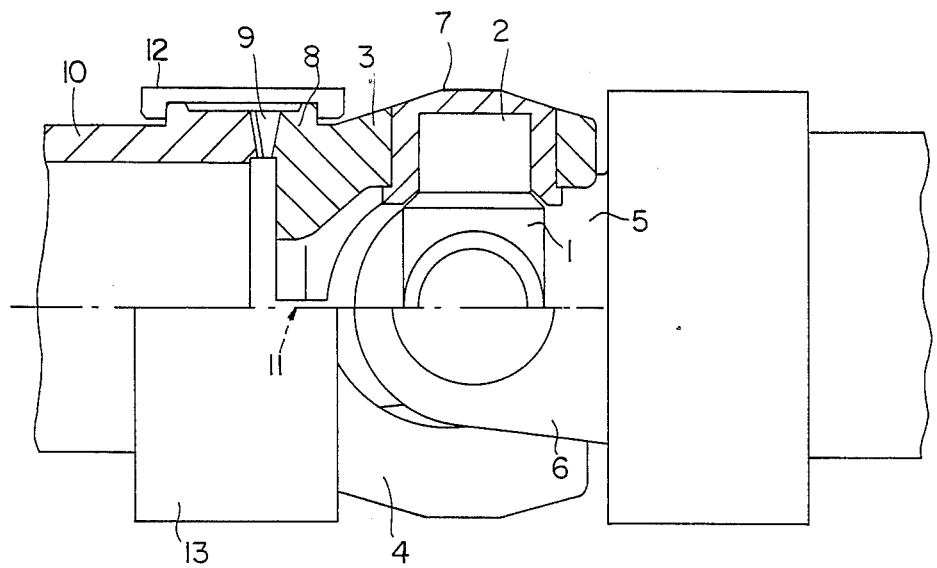
FIG. 2 shows a third embodiment for a bipartite universal-joint yoke with a hub part formed thereon.
Figure 2:
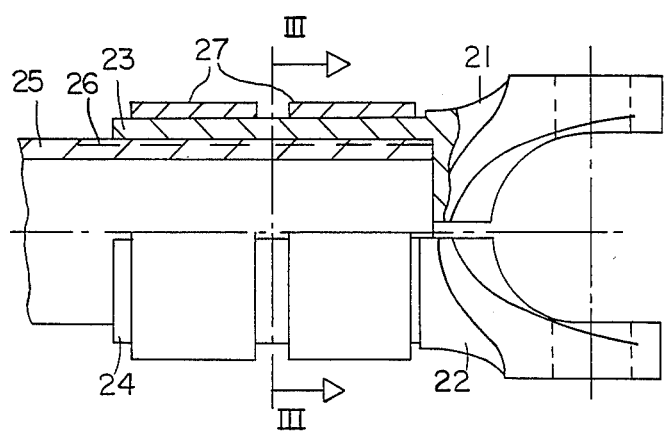
Figures 3A, 3B:
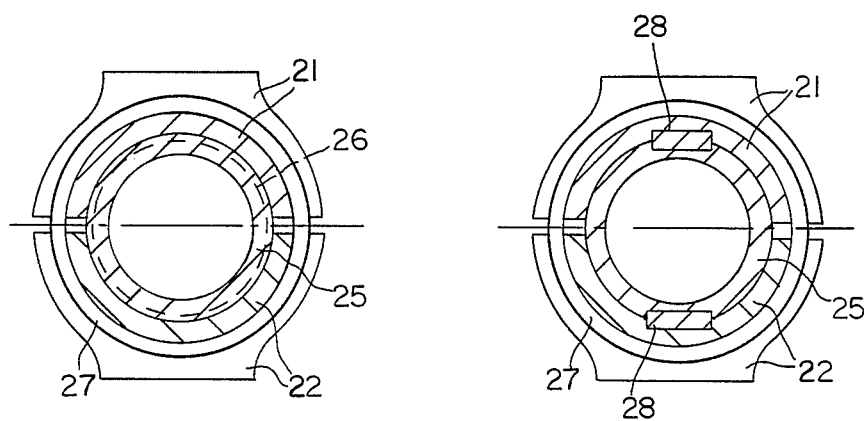
FIGS. 3a and 3b are sections along the section line III—III of FIG. 2 showing two variations of the hub and shaft connection.

FIG. 2 shows a third embodiment of the invention. In FIG. 2 also, the upper half is a sectional view and the lower half is an external, elevational view. In this case, the yoke is again developed in two parts. Outwardly from the vicinity of the pins and their bearings, the yoke halves 21, 22 are each continued in respective semicircular forms in the axial direction so that the yoke halves also form a split hub having the hub halves 23, 24. These two hub halves are connected and fixed for rotation to a shaft 25, which extends beyond them, for instance, by a toothing 26. This toothing 26 may be a spline-shaft profile arranged on the outer periphery of the shaft portion 25 and on the inner periphery of the yoke hub halves 23, 24, as shown in FIG. 3a in a cross-section along the section line III—III of FIG. 2, or it may be a tongue and groove joint 28, as is shown in FIG. 3b in cross-section along the same line. The yoke halves 21, 22 can be attached to the shaft end 25 by one or more shrink rings 27 which surround the outer periphery of the hub parts 23, 24 and produce firm attachment to the shaft 25. The hub parts 23, 24 can be axially secured on the shaft end 25 in a customary manner by lock rings, by bonding, or the like.

All embodiments of the invention share the feature that it is not necessary to develop the two halves of a split yoke to be separate from the hub. It is, therefore, also possible, as shown, for instance, in FIG. 1, to have the yoke half 4 integral with the hub 10 and to only have the yoke half 3 detachable from the hub. However, for simplicity in manufacture and in order to obtain higher precision and higher quality balancing, symmetrical construction of the split yoke is preferred.

Although the present invention has been described in connection with a number of preferred embodiments thereof, many variations and modifications will now become apparent to those skilled in the art. It is preferred, therefore, that the present invention be limited not by the specific disclosure herein, but only by the appended claims.

What is claimed is:

1. A universal joint for a drive shaft, comprising:
   a spider cross having first and second pairs of oppositely, outwardly directed pins;
   a first and a second yoke, each yoke having two respective yoke arms each yoke arm engaging one of the pins; the arms of the first yoke engaging the first of the pairs of pins, and the arms of the second yoke engaging the second of the pairs of pins, said engagement being in a pivotal manner such that the spider cross is pivotable around a first axis between the first pair of pins with respect to the first yoke and is pivotable around a second axis between the second pair of pins with respect to the second yoke;
   at least one of the respective yoke arms in at least the first yoke being separable from the rest of the first yoke; the separable yoke arm having an engaging surface for receiving torque from a generally circular surface, the engaging surface having a length extending over substantially half the circumference of the generally circular surface;
   means for transmitting torque between the engaging surface and the generally circular surface;
   means for clamping the two yoke arms of the first yoke together and for clamping them over the respective pair of pins of the spider cross, the clamping means further being for applying a pressing force over substantially the entire length of the engaging surface for holding the engaging surface against the generally circular surface; and
   a hub extending away from the spider cross, the hub having the generally circular surface defined thereon; wherein said separable yoke arm has an end side facing away from the spider cross; a respective flange at the end side of the separable arm, the flange having the engaging surface defined thereon; the torque transmitting means being between the flange and the respective hub of the yoke for transmitting torque between the engaging surface on the flange and the generally circular surface on the hub.

2. The universal joint of claim 1, wherein the torque transmitting means comprises cooperating end toothing defined in the engaging surface of the flange and in the generally circular surface of the hub.

3. The universal joint of claim 1, wherein the torque transmitting means comprises a form locked driving element projecting into and for engaging the flange and the hub.

4. The universal joint of claim 1, in which the clampling means comprises means for exerting axial pressing force between the separable yoke arm and the hub for holding that yoke arm and the hub together.

5. The universal joint of claim 4, in which the yoke arms define parting lines at two spaced locations around the hud and located betwen the arms of the yoke, the yoke arms being separable at the parting lines as the at least one separable yoke arm is removed;

the clamping means surround the periphery of the hub and the flange in a manner for covering the parting lines between the yoke arms.

6. A universal joint for a drive shaft, comprising:
a spider cross having first and second pairs of oppositely, outwardly directed pins;
a first and a second yoke, each yoke having two respective yoke arms each yoke arm engaging one of the pins; the arm of the first yoke engaging the first of the pairs of pins, and the arms of the second yoke engaging the second of the pairs of pins, said engagement being in a pivotal manner such that the spider cross is pivotable around a first axis between the first pair of pins with respect to the first yoke and is pivotable around a second axis between the second pair of pins with respect to the second yoke;
at least one of the respective yoke arms in at least the first yoke being separable from the rest of the first yoke; the separable yoke arm having an engaging surface for receiving torque from a generally circular surface, the engaging surface having a length extending over substantially half the circumference of the generally circular surface;

means for transmitting torque between the engaging surface and the generally circular surface;
means for clamping the two yoke arms of the first yoke together and for clamping them over the respective pair of pins of the spider cross, the clamping means further being for applying a pressing force over substantially the entire length of the engaging surface for holding the engaging surface against the generally circular surface; and,
a hub extending away from the spider cross, the hub having the generally circular surface defined thereon; wherein said separable yoke arms each have end sides facing away from the spider cross; a respective flange at the respective end side of each of the separable arms, each respective flange having the engaging surface of the respective yoke arms defined thereon; the torque transmitting means being between those flanges and the hub for transmitting torque between each of the engaging surfaces and the generally circular surface on the hub.

7. The universal joint of claim 6, in which the clamping means comprises means for exerting axial pressing force between the separable yoke arms and the hub for holding the yoke arms and the hub together.

8. The universal joint of claim 7, in which the yoke arms define parting lines at two spaced locations around the hub and located between the arms of the yoke, the yoke arms being separable at the parting lines as one of the separable yoke arms is removed;

the clamping means surround the periphery of the hub and the flange in a manner for covering the parting lines between the yoke arms.

* * * * *